United States Patent
Ravishankar et al.

(10) Patent No.: US 10,291,573 B2
(45) Date of Patent: May 14, 2019

(54) WORKFLOW TO DISTRIBUTE CONTENT ACROSS A PLURALITY OF SOCIAL MEDIA PLATFORMS

(71) Applicant: Dell Products L.P., Round Rock, TX (US)

(72) Inventors: Deepak Ravishankar, Bangalore (IN); Sharmad S. Naik, Bangalore (IN); Mainak Roy, Kolkata (IN); Rathi Babu, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 204 days.

(21) Appl. No.: 14/990,048

(22) Filed: Jan. 7, 2016

(65) Prior Publication Data

US 2017/0201482 A1 Jul. 13, 2017

(51) Int. Cl.
*H04L 12/58* (2006.01)
*H04L 12/26* (2006.01)

(52) U.S. Cl.
CPC .............. *H04L 51/32* (2013.01); *H04L 43/06* (2013.01); *H04L 51/16* (2013.01)

(58) Field of Classification Search
CPC .......... H04L 43/06; H04L 51/16; H04L 51/32
USPC ......................................... 709/201, 203, 204
See application file for complete search history.

(56) References Cited

U.S. PATENT DOCUMENTS

| | | | | |
|---|---|---|---|---|
| 8,015,172 B1* | 9/2011 | Cave | ................... | G06F 17/3087 707/706 |
| 8,296,380 B1* | 10/2012 | Kelly | ................ | G06F 17/30528 709/206 |
| 8,725,572 B1* | 5/2014 | Niles | ................... | G06Q 30/0251 705/14.49 |
| 2002/0077949 A1* | 6/2002 | Qasem | ................... | G06Q 40/02 705/36 R |
| 2005/0097507 A1* | 5/2005 | White | ................... | G06Q 30/02 717/102 |
| 2006/0026114 A1* | 2/2006 | Gregoire | ........... | G06F 17/30867 |
| 2008/0086384 A1* | 4/2008 | Srinivasan | ............. | G06Q 10/10 705/26.1 |
| 2008/0183810 A1* | 7/2008 | Ruedlinger | ............ | G06Q 10/10 709/203 |
| 2008/0313005 A1* | 12/2008 | Nessland | ............... | G06Q 10/06 705/7.21 |
| 2010/0293221 A1* | 11/2010 | Sidman | ............. | G06F 17/30855 709/203 |
| 2012/0203791 A1* | 8/2012 | Holt | ........................ | G06Q 10/10 707/758 |
| 2012/0245963 A1* | 9/2012 | Peak | ........................ | G06Q 50/01 705/4 |
| 2013/0311907 A1* | 11/2013 | Goldsmith | .............. | H04L 51/32 715/758 |
| 2014/0006930 A1* | 1/2014 | Hollis | ................. | G06F 17/2247 715/234 |

(Continued)

*Primary Examiner* — Alina A Boutah
(74) *Attorney, Agent, or Firm* — Terrile, Cannatti & Chambers; Stephen A. Terrile

(57) ABSTRACT

A system, method, and computer-readable medium for performing a content distribution operation, comprising: identifying generic content for distribution; identifying at least one social media platform for distributing the generic content; generating social media platform specific content from generic content; distributing the social media platform specific content to the at least one social media platform.

18 Claims, 8 Drawing Sheets

(56) References Cited

U.S. PATENT DOCUMENTS

| | | | |
|---|---|---|---|
| 2014/0067428 A1* | 3/2014 | Snyder | G06Q 10/06 |
| | | | 705/4 |
| 2014/0067523 A1* | 3/2014 | Barnett | G06Q 30/0277 |
| | | | 705/14.45 |
| 2014/0365349 A1* | 12/2014 | Kennon | G06Q 50/01 |
| | | | 705/34 |
| 2015/0163311 A1* | 6/2015 | Heath | G06Q 30/0201 |
| | | | 709/204 |
| 2016/0036756 A1* | 2/2016 | Jorgenson | H04L 51/32 |
| | | | 709/206 |
| 2016/0246886 A1* | 8/2016 | Chakraborty | G06F 17/3089 |
| 2016/0343040 A1* | 11/2016 | Garrity | H04W 4/21 |
| 2016/0359957 A1* | 12/2016 | Laliberte | H04L 51/32 |
| 2017/0024815 A1* | 1/2017 | Jomppanen | G06Q 30/02 |
| 2017/0032434 A1* | 2/2017 | Ker | G06Q 30/06 |
| 2017/0118161 A1* | 4/2017 | Ravishankar | H04L 51/32 |

* cited by examiner

WORKFLOW TO DISTRIBUTE CONTENT ACROSS A PLURALITY OF SOCIAL MEDIA PLATFORMS

BACKGROUND OF THE INVENTION

Field of the Invention

The present invention relates to information handling systems. More specifically, embodiments of the invention relate to a workflow to distribute content across a plurality of social media platforms.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The widespread availability of such information handling systems has been instrumental in the adoption of social media into the mainstream of everyday life. Social media commonly refers to the use of web-based technologies for the creation and exchange of user-generated content for social interaction. Twitter is an example of such a social media platform where users from across the world come together to engage in live, public or professional conversations. Advertisers can participate in these conversations by connecting with users that have diverse backgrounds and interests. Social media platforms provide an effective means of sharing thoughts and views.

It is known to communicate with groups of users via a social media platform which delivers short messages. As an example, Twitter® has become an increasingly popular platform for delivering short messages to an associated group of users. With a social media platform, short message identification is often accomplished via a short message tag identifier. In certain social media platforms, this short message tag identification is accomplished using metadata such as tag data (e.g., identified as #tag (pronounced "hashtag")).

A weblog (also referred to as a blog) is a discussion or informational site published on the world wide web (Web) which includes a plurality of discrete entries (referred to as posts) which are typically displayed in reverse chronological order (i.e., the most recent post appears first). A blog provides users with an opportunity to generate focused content for customers. Blogs are important to many social media platforms as the blogs provide much of the content within the social media platform. While a business might participate in a plurality of social media platforms, the source of the content used remains with the originator such as the blog author which in many cases may be company web sites.

It is known to post outbound links directly in blog articles which can drive traffic to specific landing pages of a company website. Content such as blogs, videos, whitepapers, technical bulletins and press releases contribute towards Search Engine Optimization (SEO) factors for any products. Fresh content can also be important increase the likelihood of a search result hit when a potential customer performs a web search. Blogging regularly, provides the information about the business, related industry or specific products and naturally increases the value for searched keywords. Content which includes keywords and topics on a web site are often used by search engines to associate content with searched keywords and thus can promote the information across users. Consistent blogging can provide search engines fresh and new content to guide and create opportunities to associate keywords and tag identifiers to increase visibility on search engine results pages (SERPs). Blogging also allows a company to connect with site visitors and gain valuable insight into customer's desires by answering their questions.

It is desirable to encourage customers to link to a company's content, to tweet the content, or to email the content to others. However, usage and criteria for forwarding the content can vary from platform to platform. Similarly, the audience, geographic, and reach to the customer varies from platform to platform. Accordingly, it would be desirable to provide a solution where content (such as blog posted on organization sites) can tweet or post the edited information automatically with tag identifiers (#tags), influencers, links, channels, and images over a plurality of social media platforms.

SUMMARY OF THE INVENTION

A system, method, and computer-readable medium are disclosed for performing a content distribution operation which automatically distributes content across a plurality of social media platforms. In certain embodiments, the content distribution operation generates social media platform specific content from generic content. In certain embodiments, the social media platform specific content comprises tweets, #tags, and posts. In certain embodiments, the generic content comprises content from a blog. In certain embodiments, the content distribution operation generate a customized report for use when generating the platform specific content. In certain embodiments, the customized report is based on at least one of views, likes, number of tweets and re-tweets, favorites, and clicks on a source link. In certain embodiments, the generic content comprises at least one of a video, a white paper, a technical bulletins and a press release.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Aspects of the present disclosure include a recognition that it is desirable to post to social media platforms across multiple languages, to reach larger audiences without costing the company posting more time and money. Spreading information in multiple languages is important to capture the attention of native customers. Additionally, when there is a release of a company product where different locations have different release times it becomes important to be able to post the information at specific time considering different demographic parameters. A preferable time to post information to a social media platform may vary by geographic location (e.g., by country, region or continent). Finding a desirable time to post on a specific social media platform is an important consideration, especially when each of these social media platforms has its own audience. Additionally, the sentiment of a user may vary from region to region, from language to language as well as other native preferences.

Additionally, aspects of the present disclosure include a recognition that in many situations, a company's presence on a social media platform serves as a gateway to their website. This gateway can be especially beneficial to companies which conduct a large amount of business via their website. Accordingly, it is desirable to reach different region using suitable languages, giving preference to their timing, connecting via influencers and opting for the best fit #tags over multiple platforms to cover all the potential business.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
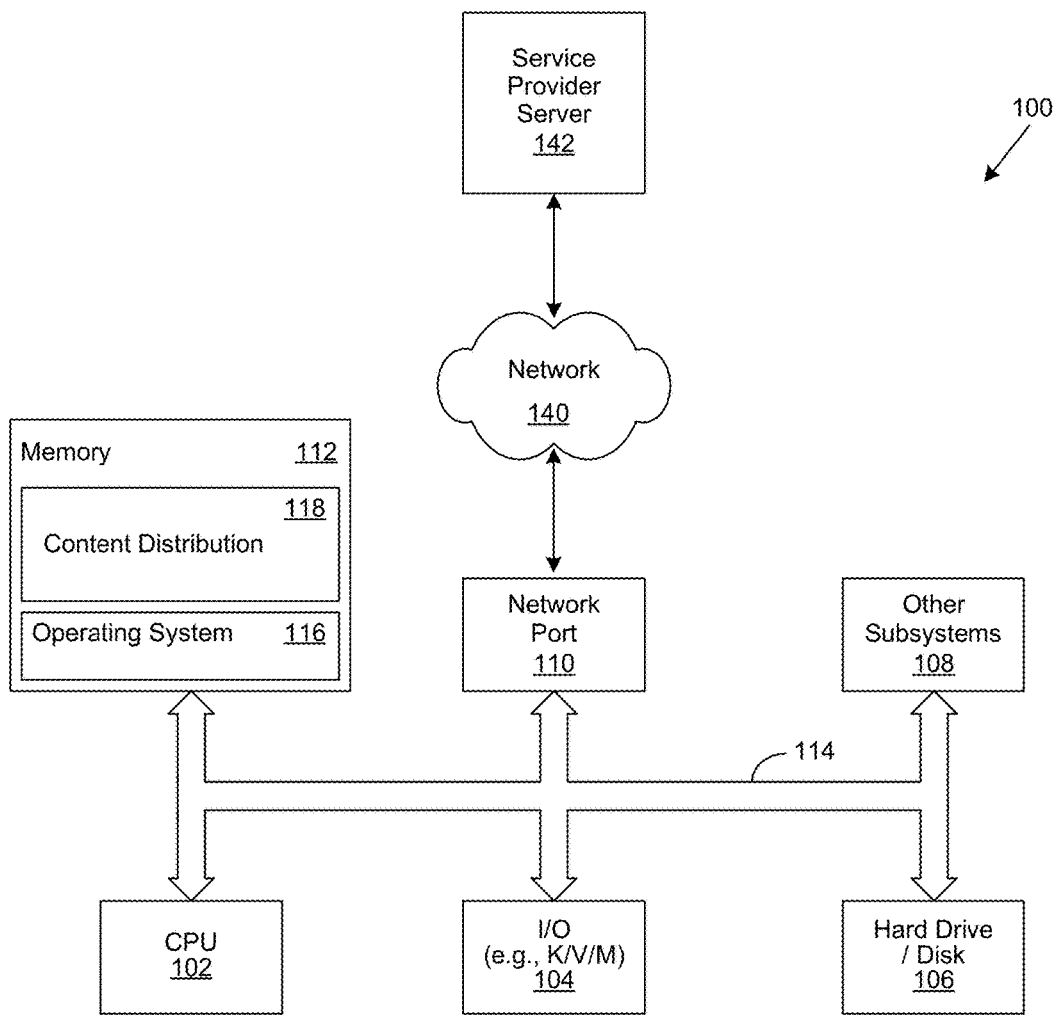
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a content distribution module 118.

The content distribution module 118 performs a content distribution operation which includes a workflow to distribute content over a plurality of social media platforms. In certain embodiments, the content distribution operation captures trending tag identifiers for a particular business. In certain embodiments, the content distribution operation generates new tag identifiers based on fresh keywords contained within content such as a blog. In certain embodiments, the content distribution operation suggest new tag identifiers for any new features of a product such that the inputs are controlled by the company. In certain embodiments, the content distribution operation identifies unique keywords relating to a new product or service from the content. In certain embodiments, the content distribution system contributes towards increasing the SEO factors associated with an individual product. In certain embodiments, the content distribution system assists sales personal, field personal and outbound marketing teams when promoting new product offerings. In certain embodiments, the content distribution system functions across a plurality of social media platforms. In certain embodiments, the content distribution system builds upon or expands a company network by involving more customers, educating beginners with resources (such as blogs, videos, whitepapers, technical bulletins and press releases) to increase the distribution of resources over a plurality of social media platforms.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 2:
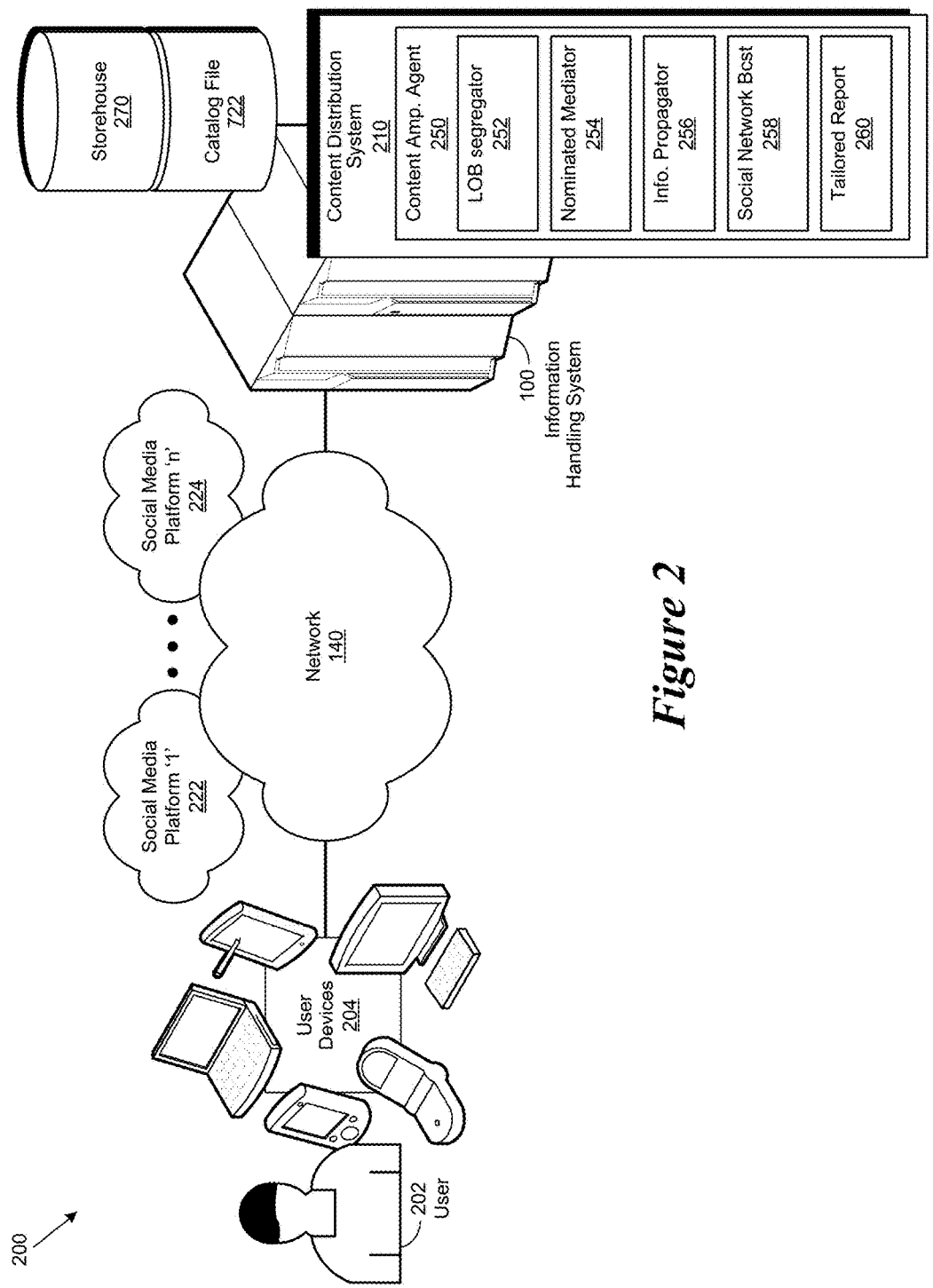
FIG. 2 shows a block diagram of a content distribution environment.

FIG. 2 is a simplified block diagram of a content distribution environment 200 implemented in accordance with an embodiment of the invention. In various embodiments, a user 202 may generate content and subsequently post the content to a social media platform 'a' 222 through 'n' 224. In these and other embodiments, the user 202 may use a user device 204 to generate and post the content to a social media environment 'a' 222 through 'n' 224.

As used herein, a user device 204 refers to an information handling system such as a personal computer, a laptop computer, a tablet computer, a personal digital assistant (PDA), a smart phone, a mobile telephone, or other device that is capable of communicating and processing data. In various embodiments, the user device 204 is used to exchange information between the user 202 and a social media environment 'a' 222 through 'n' 224 through the use of a network 140. In certain embodiments, the network 140 may be a public network, such as the Internet, a physical private network, a wireless network, a virtual private network (VPN), or any combination thereof. Skilled practitioners of the art will recognize that many such embodiments are possible and the foregoing is not intended to limit the spirit, scope or intent of the invention.

In this embodiment, a content distribution system 210 is implemented on an information handling system 100 to perform a social media amplification operation to a social media platform 'a' 222 through 'n' 224. In these various embodiments, the network 140 is used by the content destruction system 118 to monitor the social media platforms '1' 222 through 'n' 224.

In various embodiments, the content distribution system 210 includes some or all of the functionality of the content distribution module 118. In certain embodiments, the social media amplification system 210 includes a content amplifier agent 250. The content amplifier agent 250 further includes one or more of a line of business (LOB) segregator module 252, a nominated mediator module 254 an information propagator module 256, a social networking broadcaster module 258 and a tailored report module 260.

In various embodiments, the content amplifier agent 250 is associated with and executes on a server type information handling system such as information handling system 100. The server type information handling system may be internal to a particular company or may be associated in some way with a particular company such as by executing on a virtual machine which is remotely located but is controlled by the company. The content amplifier agent 250 communicates with and receives information from a social media platform such as the Twitter social media platform. In certain embodiments, the content amplifier agent 250 accesses the social media platform via a predefined set of application program interfaces (APIs) such as the streaming APIs available from certain social media platforms.

The content amplifier agent 250 executes on a server type information handling system 100 which is coupled to a network 140 so as to be able to interact with social media platforms 222, 224. The content amplifier agent 250 accesses uses streaming application program interfaces (APIs) from the various social media platforms 222, 224. In certain embodiments, the streaming APIs are provided by a short message social media platform such as the Twitter social media platform. In various embodiments, the streaming APIs provide the content amplifier agent 250 access of to the public streams, users streams and site streams. The streaming enables the server type information handling system to execute different queries from multiple platforms. In certain embodiments, the content amplifier agent 250 has the control to work on inbound data and periodically check out bound data to enhance the internal parameters (e.g., demographic parameters) when performing a content distribution operation.

After the content amplifier agent 250 collects the information from the social media platform, the content amplifier agent 250 stores the parameters for its product portfolio within a storehouse repository 270. In certain embodiments, the content amplifier agent 250 interacts with one or more line of business (LOB) specific filters to categorize the collected data. This categorization information is stored within a catalog file 272 (catalogfile). The information collection is performed by the content amplifier agent 250 on a regular basis and the content amplifier agent 250 categorizes the collected data periodically. In certain embodiments, wherever there are newer influencers, newer #tags, the storehouse repository 270 and the catalog file 272 are updated accordingly. The content amplifier agent 250 provides the company with an interface to the social media platforms 222, 224. These devices will fetch the catalog file periodically so that they have access to the most recent parameters. The content distribution system 210 can be configured regarding how often to collect parameters from social media platforms and how often to generate the catalog file 272.

In certain embodiments, various user devices 204 provide an interface with the social media platform. These user devices 204 fetch information from the database and/or the catalog file on a regular basis (e.g., periodically) so as to have access to the information relating to content distribution operations. The user 202 may be an administrative user who can schedule the process of obtaining this information. The user 202 can also collect information stored to the database by the content amplifier agent 250 as well as any catalog file generated by the content amplifier agent on any desired time period.

Using this information, a user 202 can now use the content distribution information when posting to a particular social media platform. The user 202 can also use this information to join an ongoing trend within one or more social media platforms.

The content distribution operation distributes and amplifies information over plurality of social media platforms from a company's content resources (e.g., blogs, videos, whitepapers, technical bulletins and press releases) spontaneously for the company's business. Once the content is posed via a portal such as a blogging portal, the content is segregated based upon lines of business of the company. The content distribution operation also checks for any trending tag identifiers, influencers, URLs, and channels for the product or LOB with which the content is associated. If the content is associated with a new product or LOB, the content distribution operation suggests tag identifiers based on the content keywords. The content distribution operation also selects one or more social media platforms based on the products or user's requirements, customizes the content for respective social media platforms and then enables the agents to broadcast the information over the selected social media platforms. Thus, the content distribution operation broadcasts important company information via social media platforms using content information, so that the content receives visibility among other information of the same or related trends.

The content amplifier agent 250 enables a user to generate content such as blogs, videos, whitepapers, technical bulletins or press releases via a collaboration application platform such as the Telligent collaboration platform available from Dell, Inc. This content may also be generated directly within a company website or console application. However, the content is generated, the content is then posted to one or more company web pages. The content amplifier agent 250 then uses this posted content to modify (if necessary) and distribute the content over the Internet via one or more social media platforms.

The LOB segregator module 252 monitors the company web sites for posting of content. Using a platform specific database (such as the storehouse 270), the LOB segregator module 252 selects a product or line of business with which the content is associated. The LOB segregator module 252 then distributes the content via social media platforms that are appropriate for the associated product or line of business. For example, if the social media platform is a Twitter type of social media platform, the content is distributed via a tweet or post using company identifiers. If the content is generic, the LOB segregator module 252 helps define specific LOBs with which the content should be associated. Once the lines of business are defined, a user may be guided with a list of prioritized metadata (e.g., trending #tags, list of influencers, exact .html links) for that particular line of business which covers the content. The LOB segregator module 252 provides a list of the influencers (and customers) for a specific business which individuals can follow and address while spreading the latest information. If appropriate, the LOB segregator module 252 uses the same set of metadata while distributing the content across different social media platforms.

In this way, the content distribution system 210 ensures that the same set of Keywords are being used by different users over multiple social media platforms for the same products. This consistency contributes towards the search ability of that particular product and contributes towards the trends associated with the products.

For the new products, it is important to generate relevant and unique #tags based on the content. The LOB segregator module 252 identifies and suggests new keywords for a new product from the content. In certain embodiments, the LOB segregator module 252 converts the new keywords to tag identifiers (e.g., #tags) for further usage. When the new #tags are broadcast through multiple channels, the content associated with the product will gain momentum and start generating new trends.

The nominated mediator module 254 performs a classification operation for the content distribution system 210. The nominated mediator module 254 selects one or more of a plurality of interfaces by selecting social media platforms based on the requirements or products. The nominated mediator module 254 reviews the content and provides an option to select specific social media platforms for broadcasting the content. In certain embodiments, the nominated mediator module 254 includes a separate agent for each social media platform. In certain embodiments, the nominated mediator module 254 includes capabilities to add a new platform at a later point of time. Thus, if a user wishes to add another social media platform (at a later point of time) for particular content, the nominated mediator module 254 facilitates adding the social media platform and broadcasting the content via the platform.

The information propagator module 256 provides an interactive function for content amplifier agent 250. The information propagator module 256 interacts with a browser while initiating posting of content to a social media platform. The information propagator module 256 fetches the content from a content resource storage location (e.g., storehouse 270). The information propagator module 256 generates specialized content (i.e., content designed for a particular social media platform) based on the information received from nominated mediator module 254. Because social media platforms are different and can have their own best practices rule and constraints, the information propagator module 256 maintains information relating to each specific social media platform prerequisites and rules. The information propagator module 256 uses this information when generating the specialized content. In certain embodiments, the information propagator module 256 displays the separate content for particular social media platforms.

For example, certain social media platforms may include character limits and/or may have certain associated lists of influencers. Additionally, certain social media platforms may include specific trending information such that the trends may vary from platform to platform. The information propagator module 256 maintains an updated record of such individual parameters by syncing periodically with a LOB specific filter. The information propagator module 256 then passes this information to the social networking broadcaster module 258.

After the information propagator module 256 is ready with the customized content, the social networking broadcaster module 258 ensures that only the selected agents (corresponding to particular social media platforms) are activated. The social networking broadcaster module 258 then broadcasts the content via the selected social media platforms. In certain embodiments, the social networking broadcaster module 258 holds a company authentic identifier for any particular platform to broadcast the desired content. In certain embodiments, the social networking broadcaster module 258 also provides information metadata, such as how many likes, retweets, favorites, downloads, and share for individual social media platforms. In certain embodiments, the company specific identifiers are based on lines of business and/or products of the company.

The tailored report module 260 collects metadata for a specific platform for multiple contents from the social network broadcaster module 258. In various embodiments, this metadata can include how many users have viewed a particular blog or post (e.g., a tweet). This metadata can provide the exact information of which social media platform has the highest impact on the content. In various embodiments, the tailored report module 260 can also provide information about a number of views, retweets, shares, favorites, and downloads for specific platforms and specific company owned channels. The tailored report module 260 assists a company with identifying any low performing social media platforms. In certain embodiments, the tailored report module 260 generates a report with customizable details to enable a user to take corrective actions.

Figure 3:
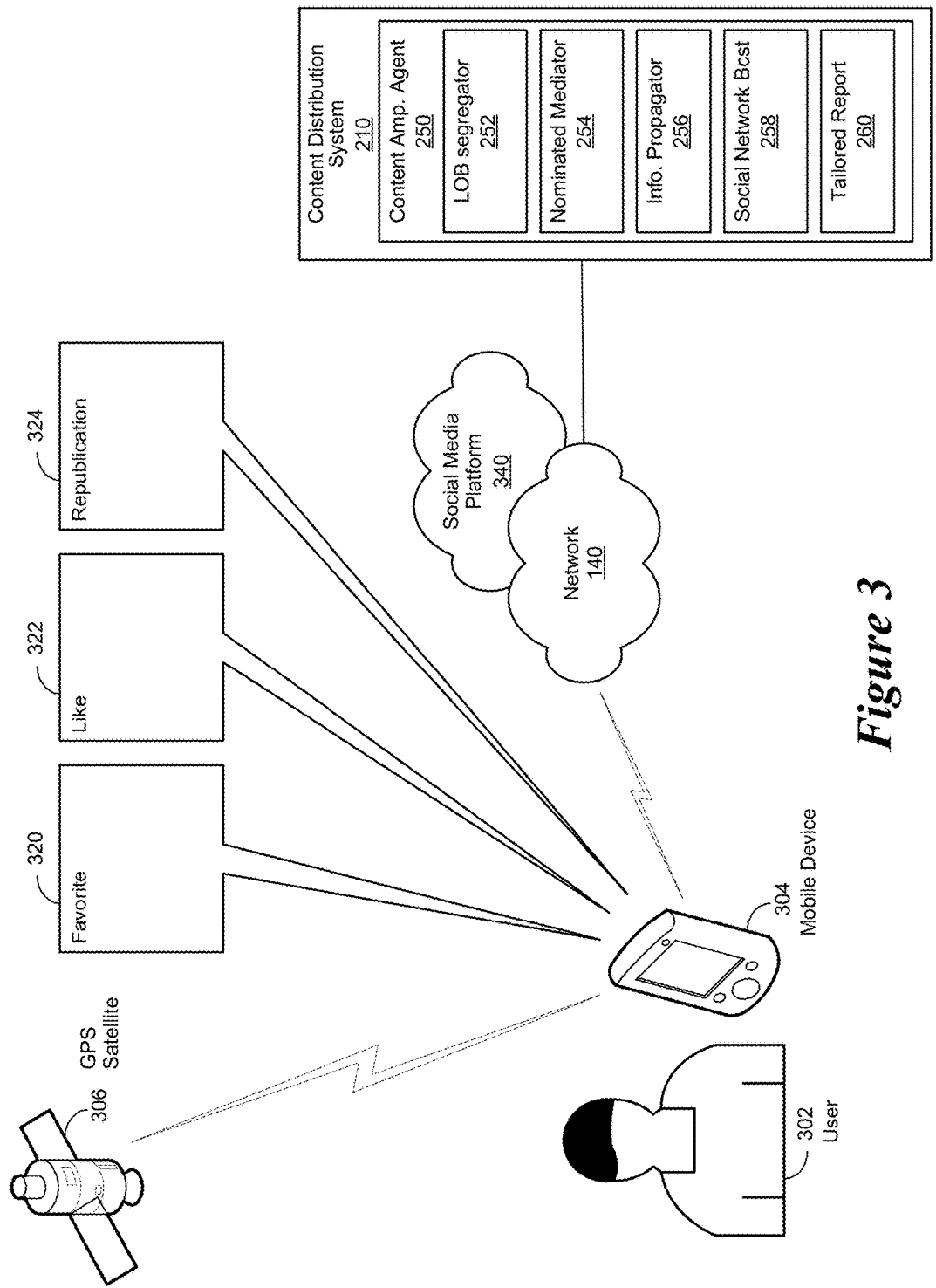
FIG. 3 shows a simplified block diagram of the delivery of a short message having specialized content.

FIG. 3 shows a simplified block diagram of the delivery of a short message implemented in accordance with an embodiment of the invention. As used herein, a short message broadly refers to a short message associated with a social media platform. In this and other embodiments, these short messages may be delivered to a mobile device 304 being used by a user 302. The social media amplification system 210 is used to provide short messages to social media platforms 340 for target regions.

As used herein, a mobile device 304 refers to wireless devices such as mobile telephones, smart phones, personal digital assistants (PDAs), tablet computers, handheld or laptop computers, and similar devices that have telecommunications capabilities. In various embodiments, the mobile device 304 is used to exchange information between a user 302 and a short message tool 310, described in greater detail herein through the use of a network 140. In certain embodiments, the network 140 is likewise used by the mobile device 304 to exchange information between the user 302 and one or more social media platforms 340.

In various embodiments, the network 140 may be a public network, such as the Internet, a physical private network, a virtual private network (VPN), a wireless network, or any combination thereof. In certain embodiments, the wireless network may be a personal area network (PAN), based on technologies such as Bluetooth or Ultra Wideband (UWB). In various embodiments, the wireless network may include a wireless local area network (WLAN), based on variations of the IEEE 802.11 specification, often referred to as WiFi. In certain embodiments, the wireless network may include a wireless wide area network (WWAN) based on an industry standard including two and a half generation (2.5G) wireless technologies such as global system for mobile communications (GPRS) and enhanced data rates for GSM evolution (EDGE). In various embodiments, the wireless network may include WWANs based on existing third generation (3G) wireless technologies including universal mobile telecommunications system (UMTS) and wideband code division multiple access (W-CDMA).

Other embodiments may include the implementation of other 3G technologies, including evolution-data optimized (EVDO), IEEE 802.16 (WiMAX), wireless broadband (Wi-Bro), high-speed downlink packet access (HSDPA), high-speed uplink packet access (HSUPA), and emerging fourth generation (4G) wireless technologies. Skilled practitioners of the art will realize that many such embodiments are possible and the foregoing is not intended to limit the spirit, scope or intent of the invention.

In various embodiments, the short message may be delivered in the form of a Short Message Service (SMS) message, a Multimedia Messaging Service (MIMS) message, or a Tweet® message, provided by Twitter, Inc. of San Francisco, Calif. Skilled practitioners of the art will be familiar with SMS messages, which are a text messaging service component of telephone, Web, or mobile communication systems. SMS messages are limited to a total of 160 seven-bit characters and use a stateless communications protocol, meaning every SMS message is considered independent of other messages. In certain embodiments, SMS messages may be concatenated to provide larger amounts of content within the cognitive short message. While SMS is typically implemented for person-to-person (P2P) messaging, it may also be implemented in certain embodiments for application-to-person (A2P) messaging. As an example, the content distribution system 210 may be implemented to deliver a content to a user's 302 mobile device 304.

Those of skill in the art will likewise be familiar with MMS messages, which provide a way to send messages that include multimedia content to and from mobile devices 304. Currently, the most popular use of MMS is to send photographs from camera-equipped mobile devices 304. However, MMS may implemented in various embodiments to deliver news and entertainment content as part of a cognitive short message. In certain embodiments, MMS may likewise be implemented to deliver scannable coupon codes, product images, audio, videos and other information as part of a cognitive short message.

Twitter, Inc. will likewise be familiar to skilled practitioners of the art as a social media service that allow users to send and receive short, 140 character messages, known as Tweets®. Currently, registered users of Twitter can read and post Tweets®, but unregistered users are only allowed to receive them. In various embodiments, Twitter can be accessed through a website interface, SMS, or an application implemented on a mobile device 304. In these and other embodiments, Twitter users may subscribe to Tweets® from other users, which is known as "following." In certain embodiments, Tweets® may be implemented to accommodate multimedia content. In these embodiments, the multimedia content may be provided as part of a cognitive short message delivered as a Tweet®.

Short message operations are initiated by first selecting a target user 302 and then performing ongoing monitoring operations to monitor their social media interactions, their physical location, and the current date and time. If a social media interaction 320 by the target user 302 is detected, then data associated with the social media interaction is captured. For example, the social media interaction data may include a user post 320 to a social media platform 340 (e.g., a tweet). The user post may take the form of a favorite indication within a short message 320, a like indication within a short message 322 or a republication (also referred to as a forwarding) short message 324 (e.g., a re-tweet). Additionally, in certain embodiments, the location of the user 302 may be determined through the use of Geographical Positioning System (GPS) satellite 306 data acquired by the user's mobile device 304. Some or all of the information gathered when performing short message operations may be used when performing a content distribution operation. For example, in certain embodiments, trending information may be derived from information obtained from the short message operations.

Figure 4:
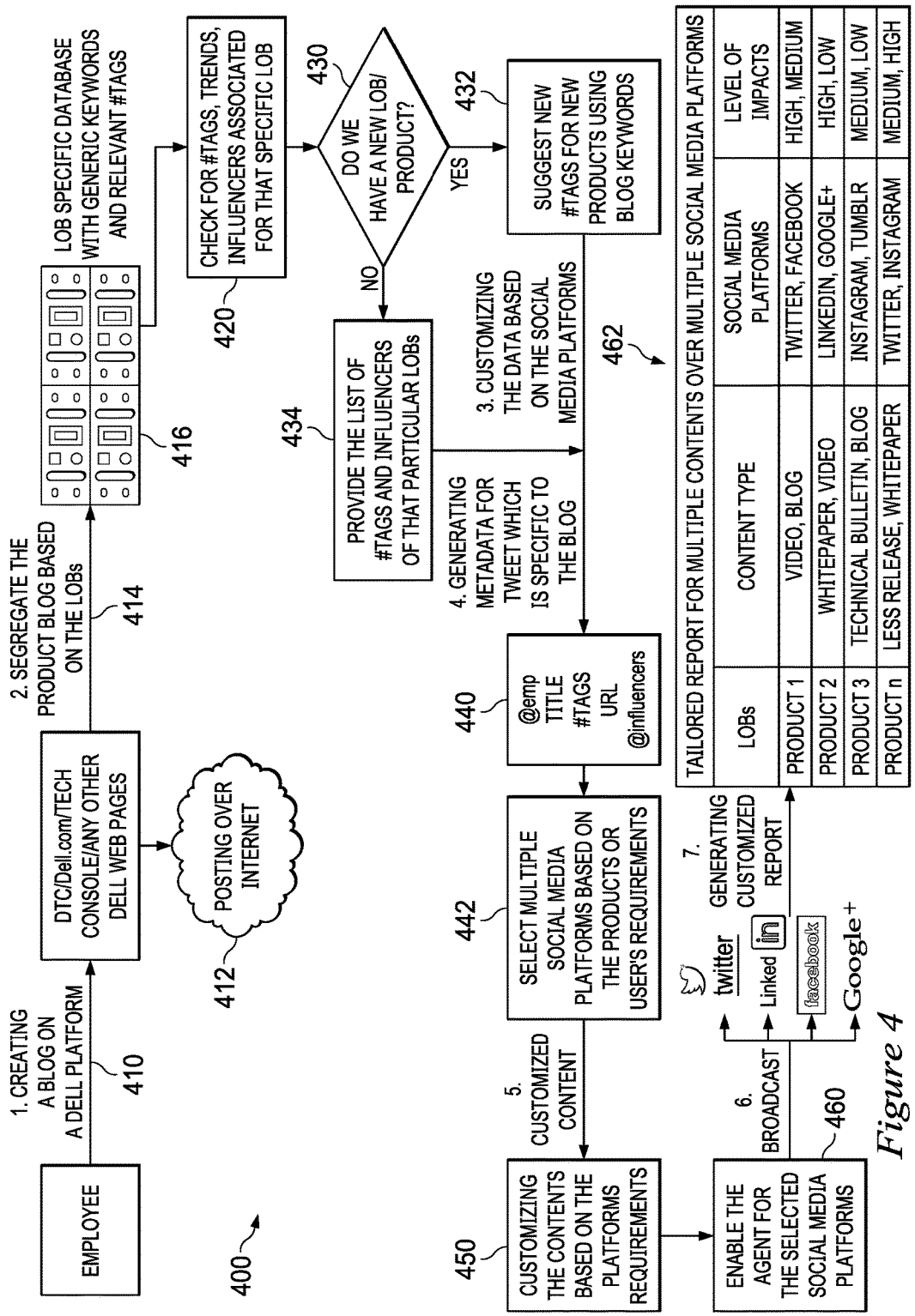
FIG. 4 shows a block diagram of a content distribution system operational flow.

Referring to FIG. 4, a block diagram of a content distribution system operational flow 400 is shown. More specifically, the content distribution system operation begins at step 410 with generation of content such as a blog. Next at step 412, the content is posted to a location on the Internet such as a company web site. Next, at step 414, the content is segregated based upon lines of business of the company. In certain embodiments, this segregation is by comparing the content with keywords and tag identification information stored within line of business specific database 416. Next, at step 420 the content is analyzed to determine whether particular tag identifiers, trends, influences are associated with a particular line of business. Next at step 430, the content is analyzed to determine whether the content is for a new line of business and/or product. If so, then the content distribution system suggest new social media information such as social media platform specific metadata (e.g., new tag identifiers) for the new product using keywords contained within the content at step 432. If not, then at step 434 the content distribution system provides a list of social media information such as social media platform specific metadata (e.g., tag identifiers) as well as influences for the particular line of business and/or product.

After the social media information is suggested, the content distribution system generates the social media platform information which is specific to the content at step 440. For example, in certain embodiments, the social media platform information can include one or more of an employee identifier (e.g., @emp), a title, tag indentifiers (#tag), particular universal resource locators (URLs), and an influencer identifier (e.g., @influencer). Next, at step 442, the content distribution system selects one or more social media platforms on which to post the content based on the products and user requirements. Next, at step 450, the content distribution system customizes the content for the particular selected social media platform. Next, at step 460, the content distribution system enables the agents for each selected social media platform to broadcast the content to respective social media platforms. Next at step 462, the content distribution system generates a report for the plurality of content over the plurality of social media platforms.

Figure 5:
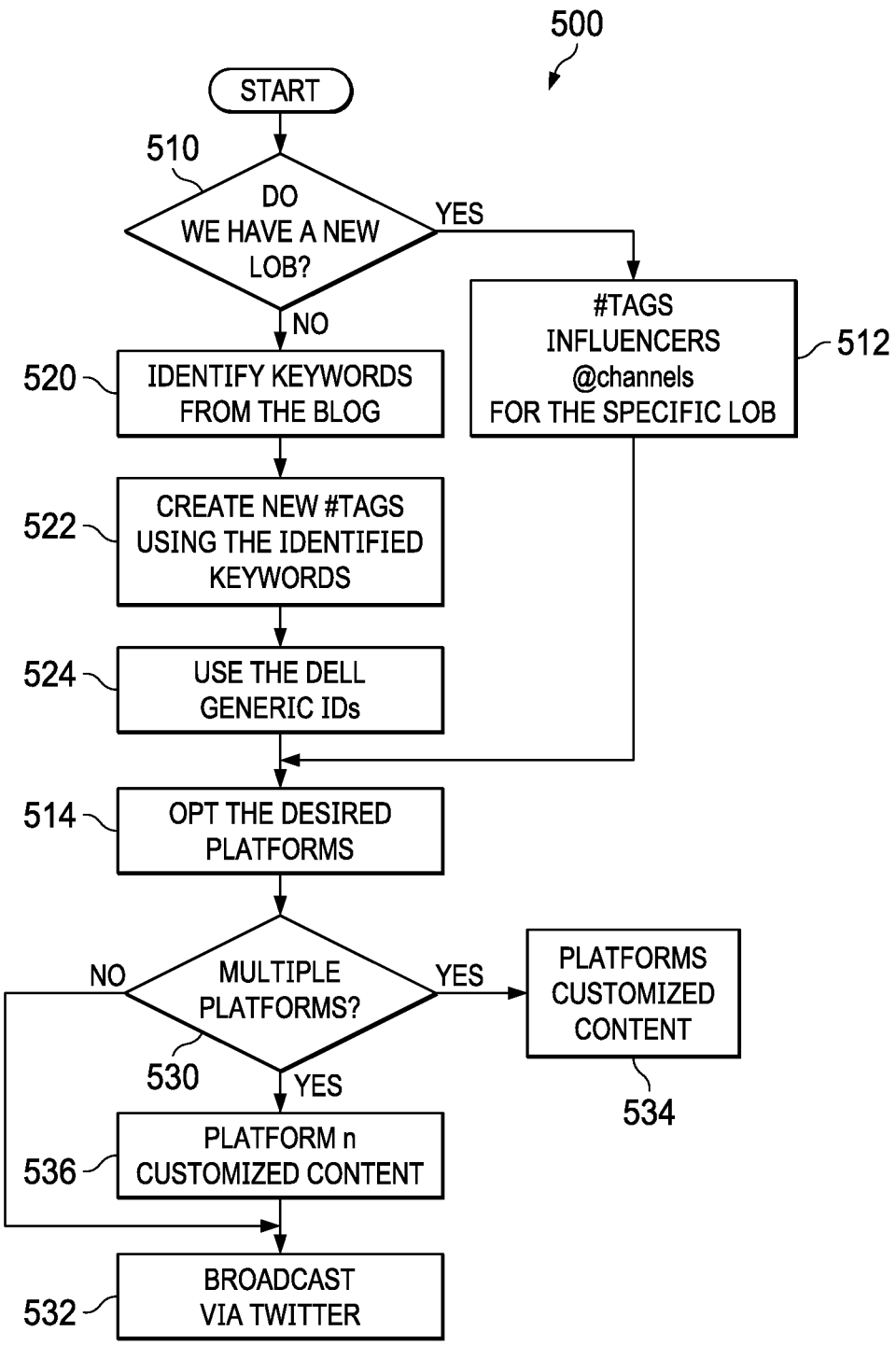
FIG. 5 shows a flow chart of an operation of identifying lines of business to broadcast content.

Referring to FIG. 5, a flow chart of an operation 500 of identifying lines of business to broadcast content is shown. More specifically, the operation starts at step 510 by determining whether the company has a new line of business. If so, then the operation proceeds to step 512 where the operation generates social media platform information which is specific to the line of business. For example, in certain embodiments, the social media platform information can include one or more of tag identifiers (#tag), a channel identifier (e.g., @channels) and an influencer identifier (e.g., @influencer). The operation then proceeds to step 514 where an option for desired platforms is provided.

If the company does not have a new line of business, then the operation proceeds to step 520 where keywords are identified within the content (e.g., the blog). Next at step 522, social media platform information specific to the content is generated based upon the identified keywords (e.g., tag identifiers). Next, at step 524 company specific identifiers are used based upon the keywords and social media platform information. The operation then proceeds to step 514 where an option for desired platforms is provided.

Next at step 530, the operation determines whether a plurality of platforms are appropriate for the content. If not, then the content is broadcast via a first social media platform (e.g., Twitter) at step 532. If so, the customized content is generated for each social media platform appropriate for the content at steps 534 and 536.

Figure 6:
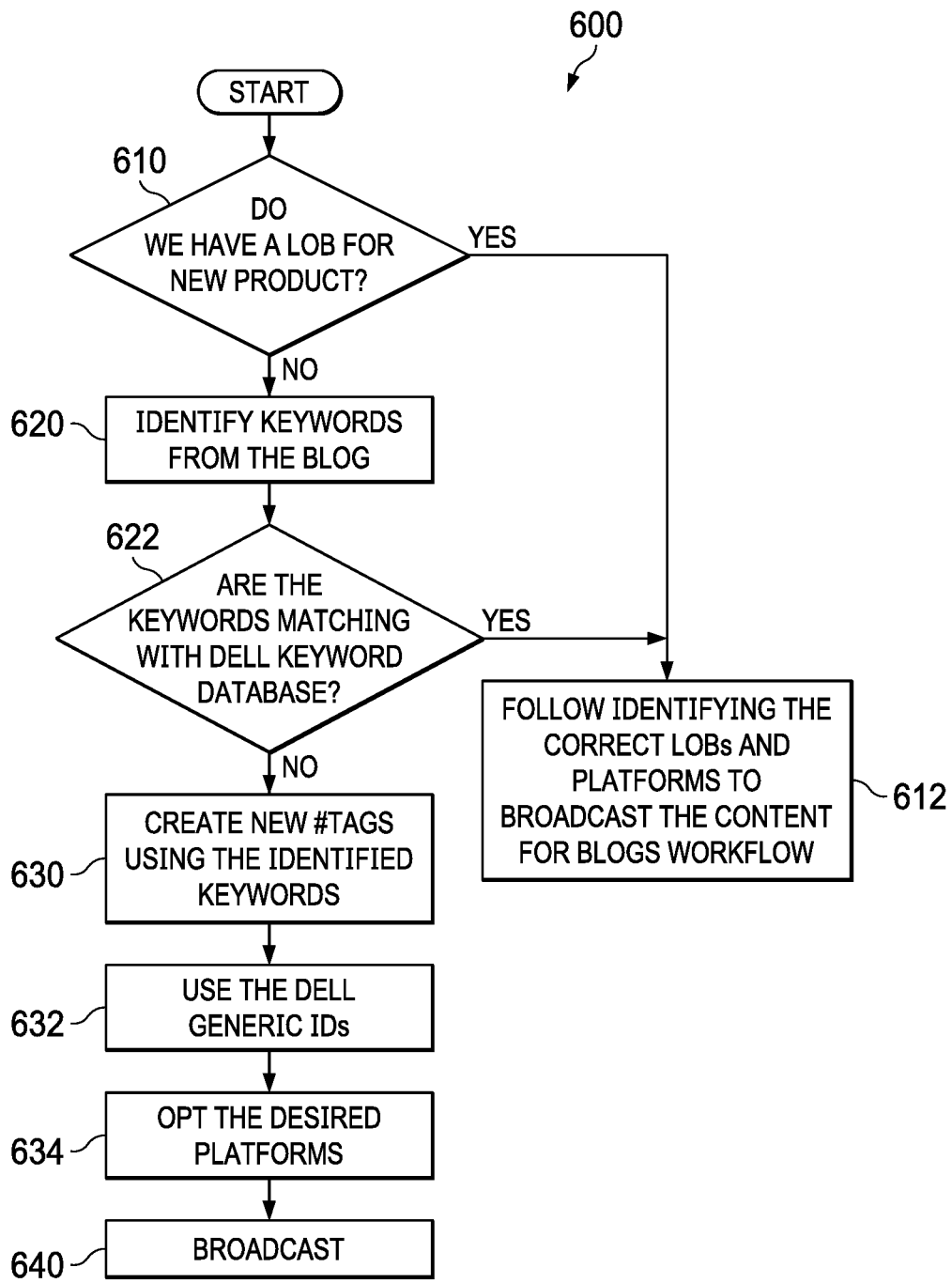
FIG. 6 shows a flow chart of an operation of addressing new company products when broadcasting content.

Referring to FIG. 6, a flow chart of an operation 600 of addressing new company products when broadcasting content is shown. More specifically, the operation begins at step 610 by determining whether the company has a line of business with which the new product is associated. If so, then at step 612 the operation 600 proceeds to perform the operation 500 of identifying lines of business to broadcast content. If not, then at step 620 the operation 600 identifies keywords within the content. At step 622, the operation 600 determines whether any of the identified keywords match with keywords within a company database. If so, then at step 612 the operation 600 proceeds to perform the operation 500 of identifying lines of business to broadcast content. If not, then at step 630 the operation 600 generates new social media platform information specific to the content based upon the identified keywords (e.g., tag identifiers). Next, at step 632 company specific identifiers are used based upon the keywords and social media platform information. The operation then proceeds to step 634 where an option for desired platforms on which to broadcast the content is provided. At step 640 the content is broadcast via the desired platforms.

Figure 7:
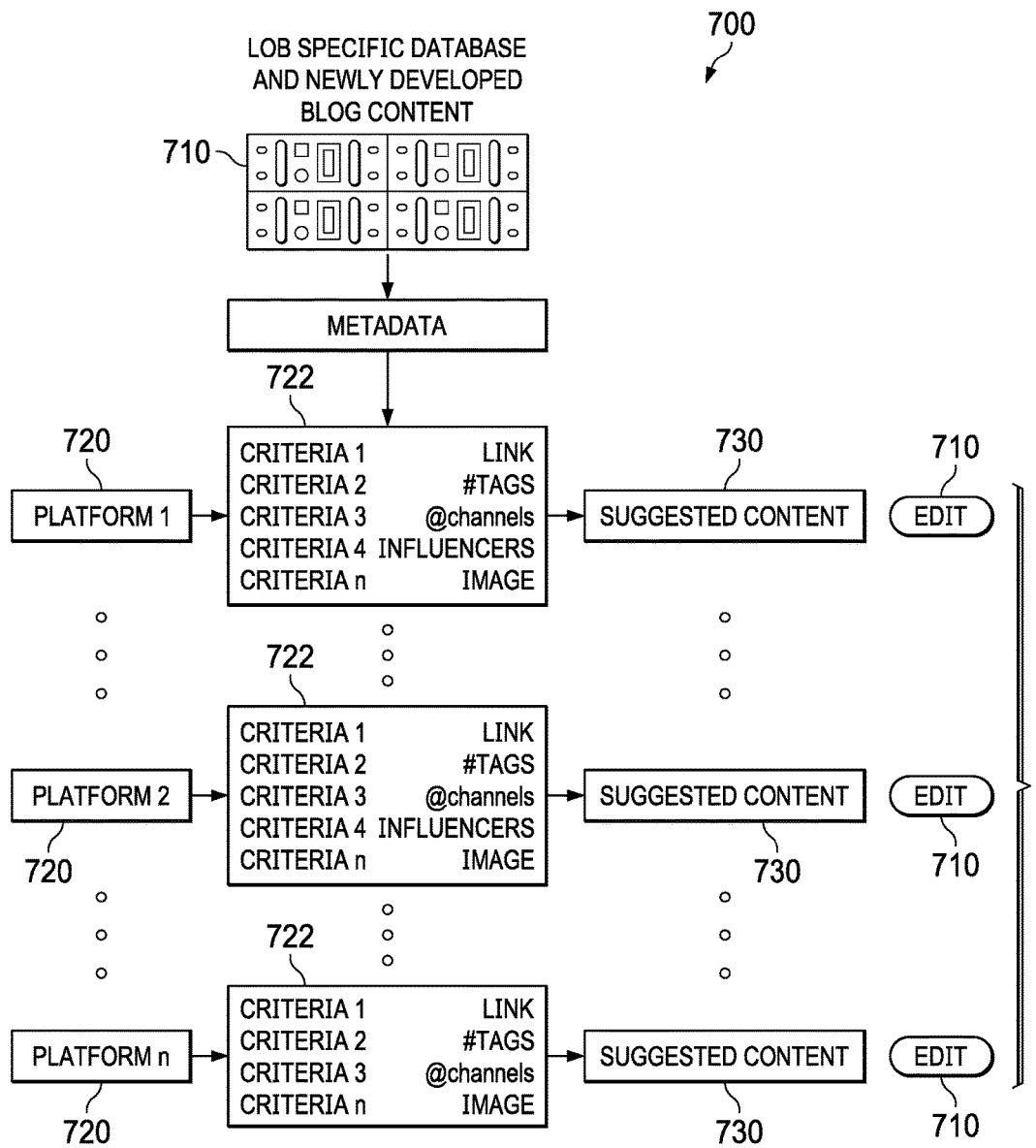
FIG. 7 shows a block diagram of an operation of customizing content based upon social media platform.

Referring to FIG. 7, a block diagram of an operation 700 of customizing content based upon social media platform is shown. More specifically, a repository 710 stores line of business specific information as well as content such as newly developed blog content. The information stored within the repository 710 is used to generate social media platform information specific to the content. Each social media platform 720 (Platform 1, Platform 2 Platform n) includes a respective plurality of content criteria 722 (Criteria 1, Criteria 2-Criteria n). Each content criteria 722 is associated with social media platform information specific to the respective social media platform. The social media platform information specific to the respective social media platform is used to provide suggested content 730 for the particular social media platform 720. A user may edit this content at step 732 to further hone the content to the particular social media platform 720.

Figure 8:
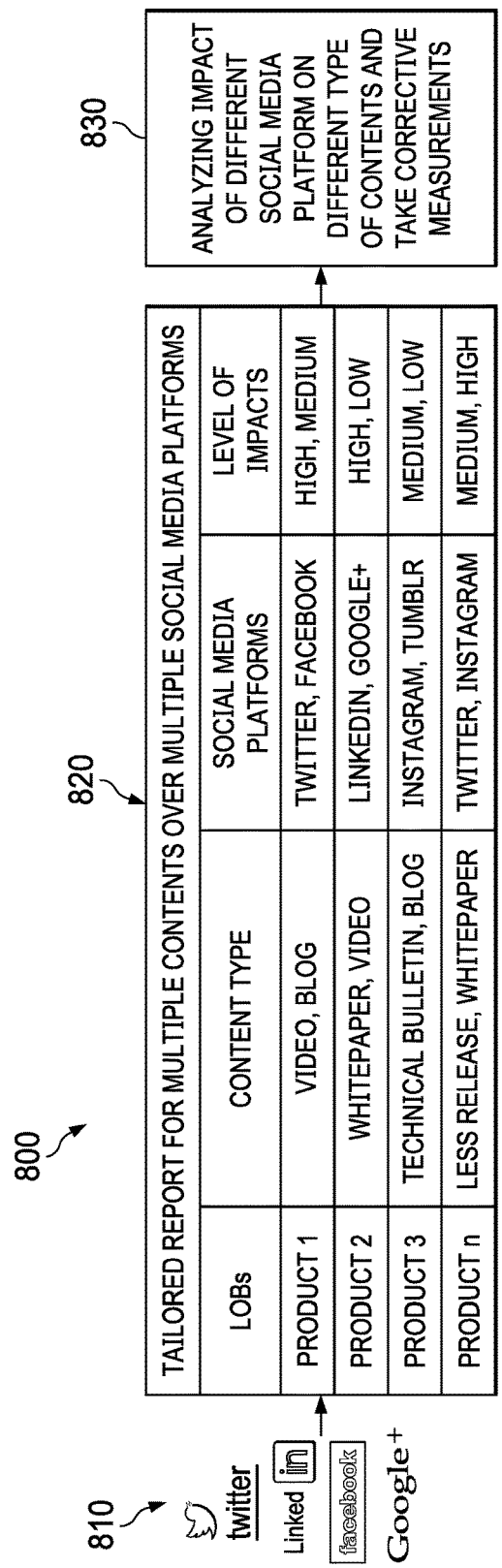
FIG. 8 shows a flow chart of a report generation operation.

Referring to FIG. 8, a flow chart of a report generation operation 800 is shown. More specifically, the operation 800 begins by analyzing a plurality of social media platforms on which the content is posted at step 810. Using the information generated by the analysis a customized report may be generated at step 820. In certain embodiments, this customized report includes information relating to associated lines of business, content types posted to each social media platform, the social media platform to which the content is posted and a level of impact due to the posting of the content. The report can be used at step 830 to analyze the impact of different social media platforms on different content types and to take corrective measures based upon the impact.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a content distribution operation, comprising:
   identifying generic content for distribution, the identifying generic content comprising identifying at least one of a first keyword within the generic content and a second keyword within the generic content;
   identifying at least two social media platforms for distributing the generic content, the at least two social media platforms corresponding to a first line of business within a company and a second line of business within the company, respectively, the first line of business being associated with the first keyword and the second line of business being associated with the second keyword;
   generating social media platform specific content from generic content for each of the at least two social media platforms, the social media platform specific content comprising first social media platform specific content, the first social media platform specific content being based upon the first keyword, and second social media platform specific content, the second social media platform specific content being based upon the second keyword, the first social media platform specific content being different from the second social media specific content;
   distributing the first social media platform specific content to a first social media platform of the at least two social media platforms and the second social media platform specific content to a second social media platform of the at least two social media platforms; and wherein
   each social media platform comprises a respective plurality of content criteria, the respective plurality of respective content criteria being associated with social media platform information specific to a respective social media platform; and,
   the social media platform information specific to the respective social media platform is used to provide suggested content for the respective social media platform.

2. The method of claim 1, wherein:
the social media platform specific content comprises at least one of tweets, #tags, and posts.

3. The method of claim 1, further comprising:
the generic content comprises content from a weblog.

4. The method of claim 1, further comprising:
generating a customized report for use when generating the platform specific content.

5. The method of claim 4, further comprising:
the customized report is based on at least one of views, likes, number of tweets and re-tweets, favorites, and clicks on a source link.

6. The method of claim 1, wherein:
the generic content comprises at least one of a video, a white paper, a technical bulletin and a press release;
the first social media platform specific content comprising at least one of a first video, a first white paper, a first technical bulletin and a first press release, the at least one of the first video, the first white paper, the first technical bulletin and the first press release being based upon the first keyword; and,
the second social media platform specific content comprising at least one of a second video, a second white paper, a second technical bulletin and a second press prelease, the at least one of the second video, the second white paper, the second technical bulletin and the second press release being based upon the second keyword.

7. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
   identifying generic content for distribution, the identifying generic content comprising identifying at least one of a first keyword within the generic content and a second keyword within the generic content;
   identifying at least two social media platforms for distributing the generic content, the at least two social media platforms corresponding to a first line of business within a company and a second line of business within the company, respectively, the first line of business being associated with the first keyword and the second line of business being associated with the second keyword;
   generating social media platform specific content from generic content for each of the at least two social media platforms, the social media platform specific content comprising first social media platform specific content, the first social media platform specific content being based upon the first keyword, and second social media platform specific content, the second social media platform specific content being based upon the second keyword, the first social media platform specific content being different from the second social media specific content;

distributing the first social media platform specific content to a first social media platform of the at least two social media platforms and the second social media platform specific content to a second social media platform of the at least two social media platforms; and wherein each social media platform comprises a respective plurality of content criteria, the respective plurality of respective content criteria being associated with social media platform information specific to a respective social media platform; and, the social media platform information specific to the respective social media platform is used to provide suggested content for the respective social media platform.

8. The system of claim 7, wherein:
the social media platform specific content comprises at least one of tweets, #tags, and posts.

9. The system of claim 7, wherein:
the generic content comprises content from a weblog.

10. The system of claim 7, wherein the instructions are further configured for:
generating a customized report for use when generating the platform specific content.

11. The system of claim 10, wherein:
the customized report is based on at least one of views, likes, number of tweets and re-tweets, favorites, and clicks on a source link.

12. The system of claim 7, wherein:
the generic content comprises at least one of a video, a white paper, a technical bulletin and a press release;
the first social media platform specific content comprising at least one of a first video, a first white paper, a first technical bulletin and a first press release, the at least one of the first video, the first white paper, the first technical bulletin and the first press release being based upon the first keyword; and,
the second social media platform specific content comprising at least one of a second video, a second white paper, a second technical bulletin and a second press prelease, the at least one of the second video, the second white paper, the second technical bulletin and the second press release being based upon the second keyword.

13. A non-transitory, computer-readable storage medium embodying computer program code, the computer program code comprising computer executable instructions configured for:
identifying generic content for distribution, the identifying generic content comprising identifying at least one of a first keyword within the generic content and a second keyword within the generic content;
identifying at least two social media platforms for distributing the generic content, the at least two social media platforms corresponding to a first line of business within a company and a second line of business within the company, respectively, the first line of business being associated with the first keyword and the second line of business being associated with the second keyword;

generating social media platform specific content from generic content for each of the at least two social media platforms, the social media platform specific content comprising first social media platform specific content, the first social media platform specific content being based upon the first keyword, and second social media platform specific content, the second social media platform specific content being based upon the second keyword, the first social media platform specific content being different from the second social media specific content;

distributing the first social media platform specific content to a first social media platform of the at least two social media platforms and the second social media platform specific content to a second social media platform of the at least two social media platforms; and wherein each social media platform comprises a respective plurality of content criteria, the respective plurality of respective content criteria being associated with social media platform information specific to a respective social media platform; and, the social media platform information specific to the respective social media platform is used to provide suggested content for the respective social media platform.

14. The non-transitory, computer-readable storage medium of claim 13, wherein:
the social media platform specific content comprises at least one of tweets, #tags, and posts.

15. The non-transitory, computer-readable storage medium of claim 13, wherein:
the generic content comprises content from a weblog.

16. The non-transitory, computer-readable storage medium of claim 13, wherein the computer executable instructions are further configured for:
generating a customized report for use when generating the platform specific content.

17. The non-transitory, computer-readable storage medium of claim 16, wherein:
the customized report is based on at least one of views, likes, number of tweets and re-tweets, favorites, and clicks on a source link.

18. The non-transitory, computer-readable storage medium of claim 13, wherein:
the generic content comprises at least one of a video, a white paper, a technical bulletin and a press release;
the first social media platform specific content comprising at least one of a first video, a first white paper, a first technical bulletin and a first press release, the at least one of the first video, the first white paper, the first technical bulletin and the first press release being based upon the first keyword; and,
the second social media platform specific content comprising at least one of a second video, a second white paper, a second technical bulletin and a second press prelease, the at least one of the second video, the second white paper, the second technical bulletin and the second press release being based upon the second keyword.

* * * * *